J. L. WAGER.
HORSE HAY-RAKE.
No. 187,070. Patented Feb. 6, 1877.
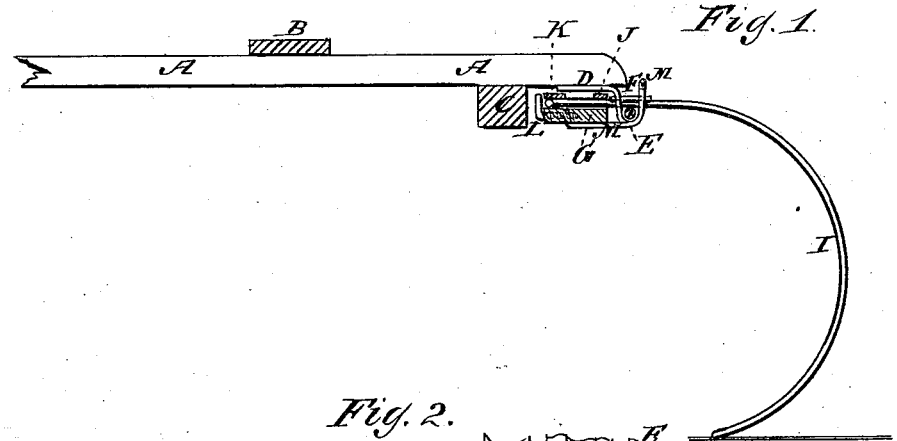
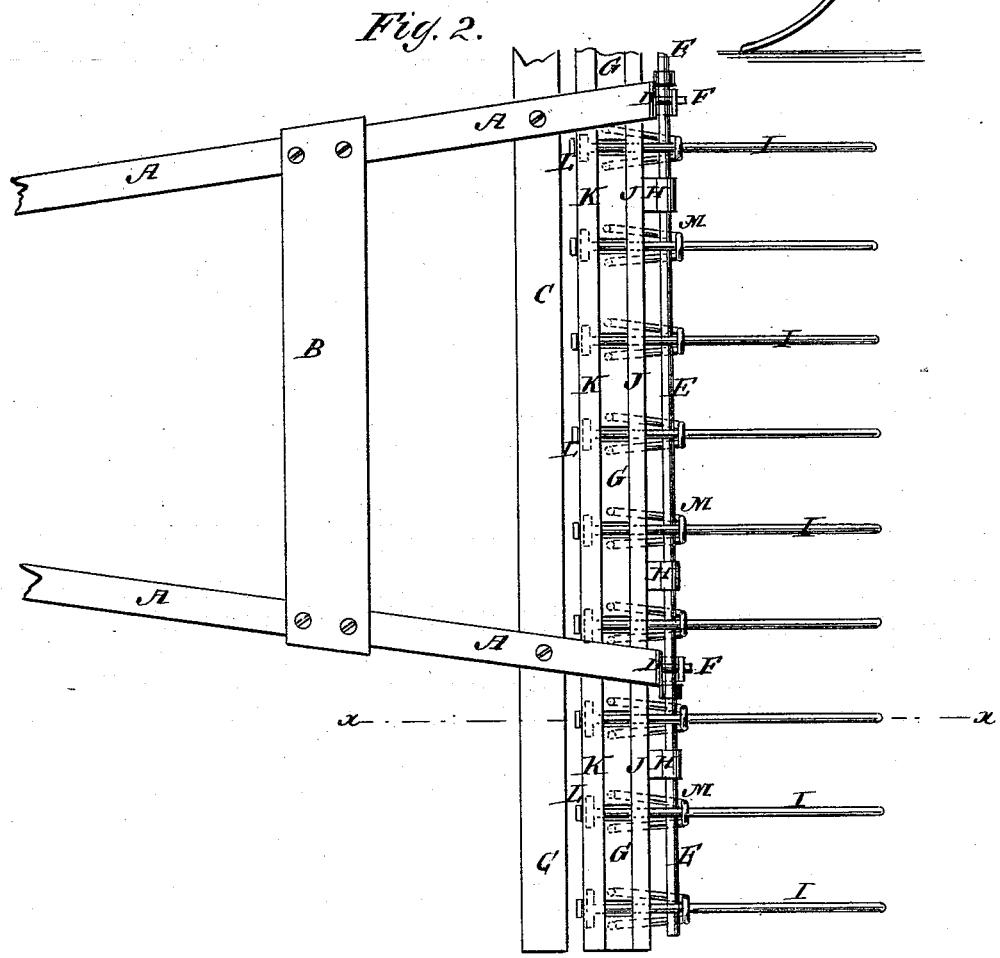
WITNESSES:
E. Wolff
John Goethals
INVENTOR:
J. L. Wager
BY Munn & Co.
ATTORNEYS.

UNITED STATES PATENT OFFICE.

JOHN L. WAGER, OF DEPOSIT, NEW YORK.

IMPROVEMENT IN HORSE HAY-RAKES.

Specification forming part of Letters Patent No. 187,070, dated February 6, 1877; application filed August 14, 1876.

*To all whom it may concern:*

Be it known that I, JOHN L. WAGER, of Deposit, in the county of Broome and State of New York, have invented a new and useful Improvement in Horse Hay-Rake, of which the following is a specification:

Figure 1 is a detail vertical section of my improved horse hay-rake, taken through the line $x\ x$, Fig. 2. Fig. 2 is a top view of a portion of the same.

Similar letters of reference indicate corresponding parts.

The object of this invention is to furnish an improved wire-toothed horse hay-rake, which shall be so constructed that the teeth may be firmly held in place, and at the same time shall be secured in such a way as to give them the necessary play, and allow them to be easily and quickly detached when desired.

The invention consists in the combination of parts, as hereinafter described and claimed.

A are the shafts, which are connected by the cross-bars B and C. To the rear ends of the shafts A are attached iron bars or straps D, upon the projecting ends of which are formed hooks to receive the rod. The rod E is secured in the hooks D by pins, screws, or bolts F, which are passed through said hooks above the said rod, as shown in Figs. 1 and 2. The rod E is firmly connected with the rake-head G by the eye-straps H. I are the teeth, which are made of wire, and are curved in the usual way. Upon the rear ends of the teeth I are formed cross or T heads. The upper parts of the teeth I rest in cross-grooves in the upper side of the rake-head G, and their cross-heads rest in a rabbet formed along the rear edge of the upper side of said rake-head. The upper parts of the teeth I are secured in the grooves of the rake-head G by a strap or bar, J, crossing the said teeth and secured to the said rake-head. In the same way the cross-heads of the teeth I are secured in their rabbet by a strap or bar, K, attached to the rake-head G, so as to cover the said cross-heads. The teeth I are kept in place by L-headed screws L, screwed into the forward edge of the rake-head G, in such positions that their heads may cross the cross-heads of the teeth I, and thus keep them in place.

By this construction, by turning the heads of the L-screws to one side, any of the teeth I may be drawn out as required. The teeth I are placed above the rod E, and their play is limited by the wire loops M, through which they pass. The arms of the loops M are bent forward, pass beneath the rake-head G, and their ends are secured to it.

Having thus described my invention, I claim as new and desire to secure by Letters Patent—

1. The combination of the hooks D, the pins, screws, or bolts F, the rod E, and the straps H with the shafts A and the rake-head G, for connecting said rake-head with said shafts, substantially as herein shown and described.

2. The combination of the bent loops M with the teeth I, the rod E, and the rake-head G, for limiting the play of said teeth, substantially as herein shown and described.

JOHN L. WAGER.

Witnesses:
G. W. HOLMES,
H. J. ADAMS.